(12) United States Patent
Shibayama

(10) Patent No.: US 6,504,655 B2
(45) Date of Patent: Jan. 7, 2003

(54) WIDE CONVERTER LENS

(75) Inventor: Atsushi Shibayama, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/827,907

(22) Filed: Apr. 9, 2001

(65) Prior Publication Data

US 2001/0040736 A1 Nov. 15, 2001

(30) Foreign Application Priority Data

Apr. 11, 2000 (JP) ........................................ 2000-109776
Mar. 22, 2001 (JP) ........................................ 2001-083559

(51) Int. Cl.⁷ ............................. G02B 15/02; G02B 9/14
(52) U.S. Cl. ........................ 359/673; 359/789; 359/790
(58) Field of Search ................................. 359/789, 790, 359/673

(56) References Cited

U.S. PATENT DOCUMENTS 2,816,482 A * 12/1957 Lange ......................... 359/673
6,097,547 A * 8/2000 Ogata et al. ................. 359/673

FOREIGN PATENT DOCUMENTS

JP          11-305118         11/1999

* cited by examiner

*Primary Examiner*—Scott J. Sugarman
(74) *Attorney, Agent, or Firm*—Miles & Stockbridge P.C.

(57) ABSTRACT

The object of the present invention is to provide a wide converter lens capable of obtaining an angle of view of about 80° or over and having small appearance of distortion. According to one aspect, a wide converter lens for using by attaching to an object side of a photographic lens includes, in order from the object side, a first positive lens having double convex surfaces, a negative lens unit including at least one negative lens, and a second positive lens having double convex surfaces. The following conditional expression is satisfied:

$$-0.8 < (r2+r1)/(r2-r1) < 0.8$$

where r1 denotes the radius of curvature of the object side surface of the first positive lens and r2 denotes the radius of curvature of the image side surface of the first positive lens.

8 Claims, 5 Drawing Sheets

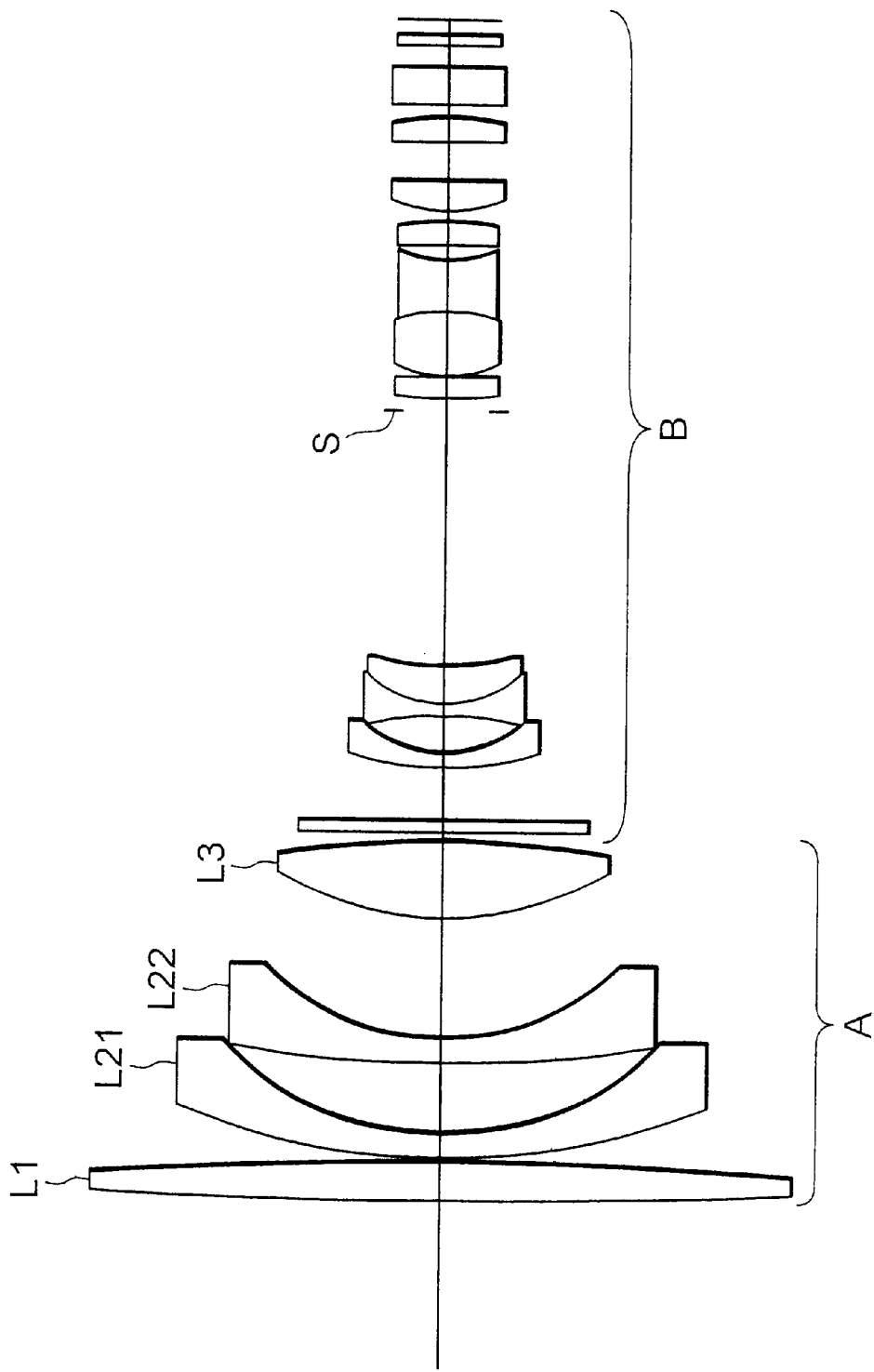

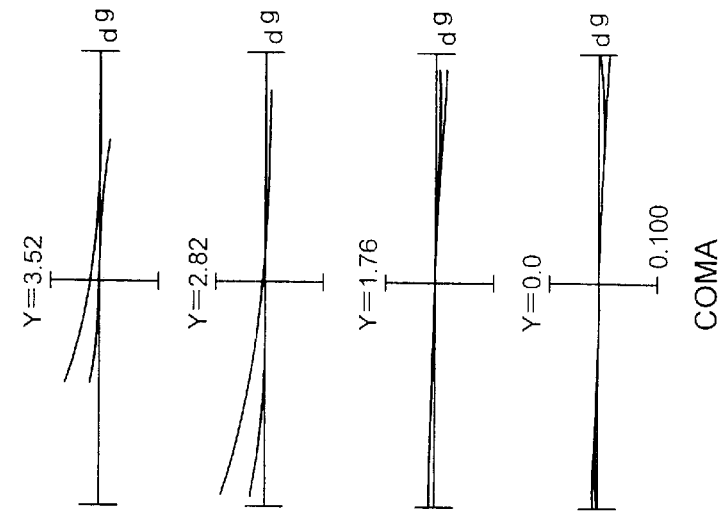
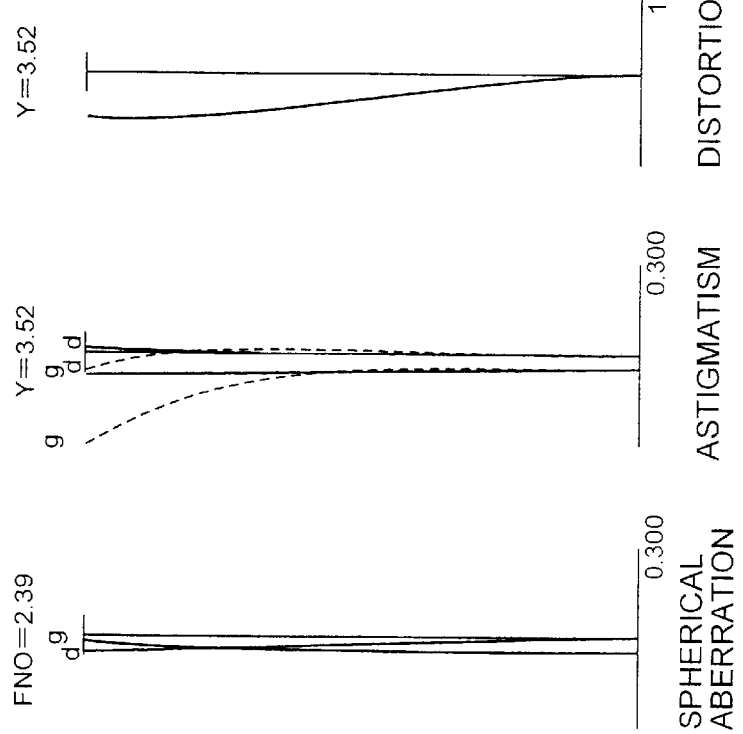
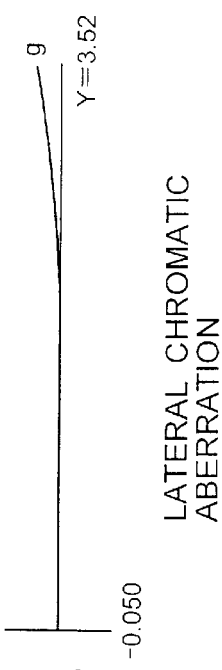

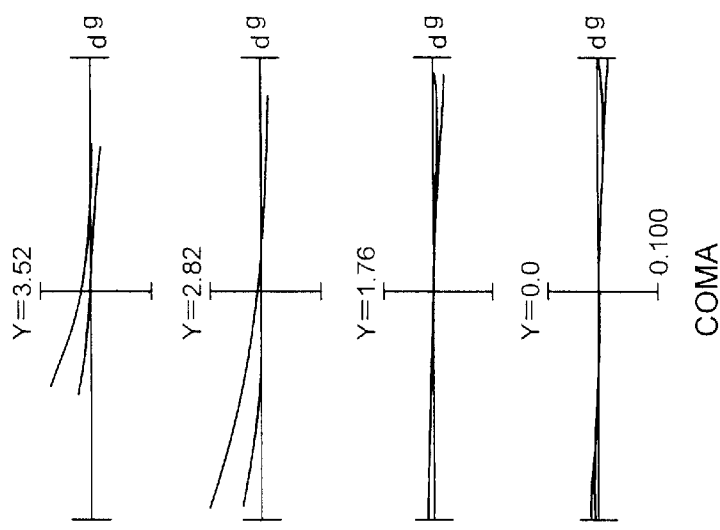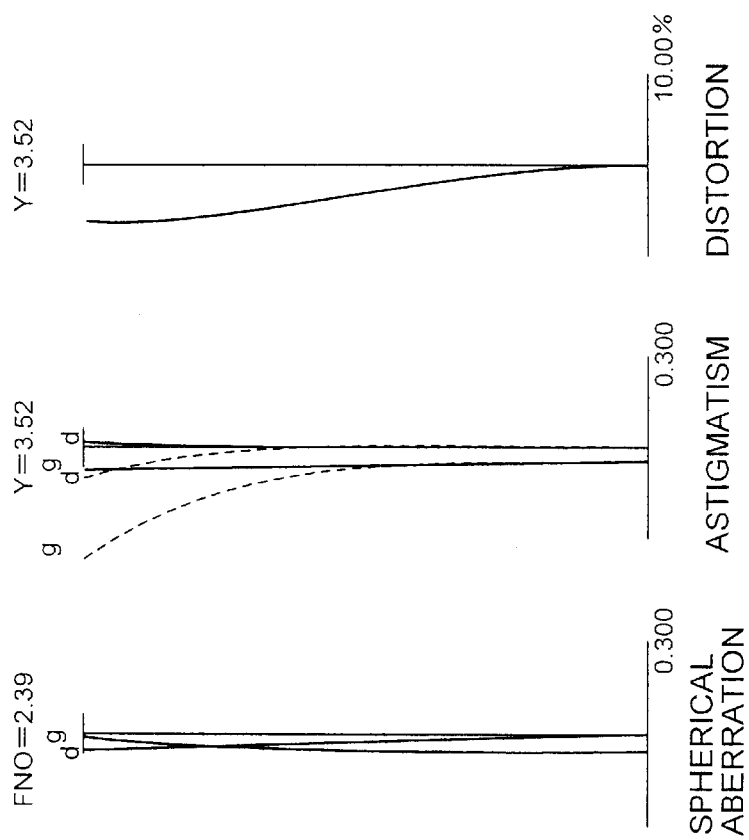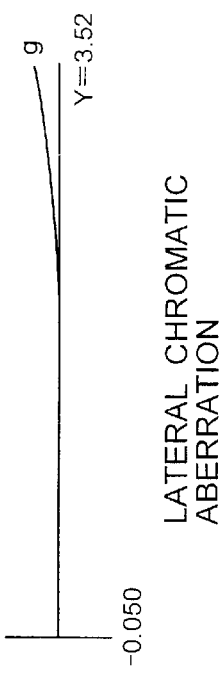

WIDE CONVERTER LENS

INCORPORATION BY REFERENCE

The disclosures of the following priority applications are herein incorporated by reference:

Japanese Patent Application No. 2000-109776 filed on Apr. 11, 2000; and

Japanese Patent Application No. 2001-83559 filed on Mar. 22, 2001.

BACKGROUND OF THE INVENTION

1. Field of the Invention

The present invention relates to a wide converter lens for shortening the focal length and widening the angle of view of a photographic lens system including thereof by attaching to an object side of the photographic lens system, in particular, relates to a wide converter lens capable of obtaining the angle of view of about 80° or over.

2. Description of Related Art

Wide converter lenses used by attaching to an object side of a photographic lens system have been proposed in large number. Above all, as a wide converter lens capable of obtaining the angle of view of about 80° or over, a wide converter lens is disclosed in Japanese Laid-Open Patent Application No. 11-305118.

However, since an example disclosed in Japanese Laid-Open Patent Application No. 11-305118 produces distortion more than 10% when the wide converter lens is applied, the appearance of distortion in a photographed scene has sometimes become obvious according to circumstances.

SUMMARY OF THE INVENTION

The present invention is made in view of the aforementioned problem and has an object to provide a wide converter having an angle of view of about 80° or over with fewer appearance of distortion.

According to one aspect of the present invention, a wide converter lens used by attaching to an object side of a photographic lens includes, in order from the object side, a first positive lens having double convex surfaces, a negative lens unit including at least one negative lens, and a second positive lens having double convex surfaces. The following conditional expression is satisfied:

$$-0.8 < (r2+r1)/(r2-r1) < 0.8 \quad (1)$$

where r1 denotes the radius of curvature of the object side surface of the first positive lens and r2 denotes the radius of curvature of the image side surface of the first positive lens.

In one preferred embodiment of the present invention, the following conditional expression is satisfied;

$$45 < \upsilon 1 \quad (2)$$

where $\upsilon 1$ denotes Abbe number of the first positive lens.

Conditional expression (1) defines an appropriate shape of the first positive lens. When the value (r2+r1)/(r2-r1) falls below the lower limit of conditional expression (1), aberrations such as astigmatism and coma deteriorate severely, so it is disagreeable. On the other hand, when the value exceeds the upper limit of conditional expression (1), correction of distortion becomes difficult.

Conditional expression (2) defines an appropriate range of Abbe number of the first positive lens. When the Abbe number falls below the lower limit of conditional expression (2), correction of lateral chromatic aberration becomes difficult.

In one preferred embodiment of the present invention, the negative lens unit consists only of a first negative lens with a meniscus shape having a convex surface facing to the object side. In this construction, since the wide converter lens can be constructed with small number of lens element, it is advantageous to lower the manufacturing cost.

In one preferred embodiment of the present invention, the negative lens unit consists of, in order from the object side, a first negative lens with a meniscus shape having a convex surface facing to the object side, and a second negative lens with a meniscus shape having a convex surface facing to the object side. This construction is advantageous for correcting coma, so that more preferable correction can be realized.

BRIEF DESCRIPTION OF THE DRAWINGS

FIG. 2 is a drawing showing a state where a wide converter lens according to an Example 2 of the present invention is attached to the master lens.

FIGS. 3A to 3E show various aberration charts produced in the state where the wide converter lens according to the Example 1 is attached to the master lens.

FIGS. 4A to 4E show various aberration charts produced in the state where the wide converter lens according to the Example 2 is attached to the master lens.

DESCRIPTION OF THE PREFERRED EMBODIMENTS

Examples (numerical examples) according to the present invention are explained with reference to accompanying drawings.

Figure 1:
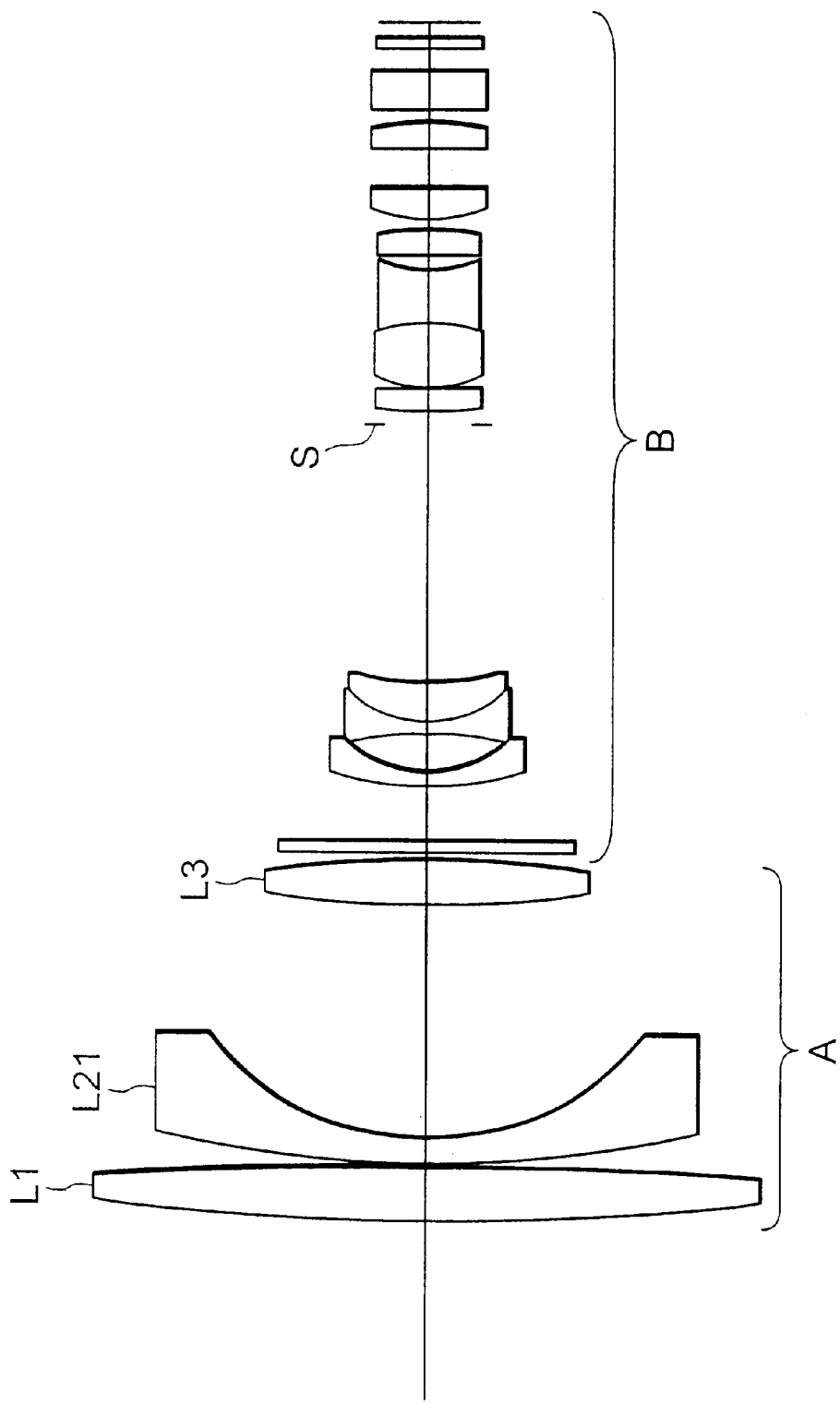
FIG. 1 is a drawing showing a state where a wide converter lens according to an Example 1 of the present invention is attached to a master lens.
Figures 5A, 5B, 5C:
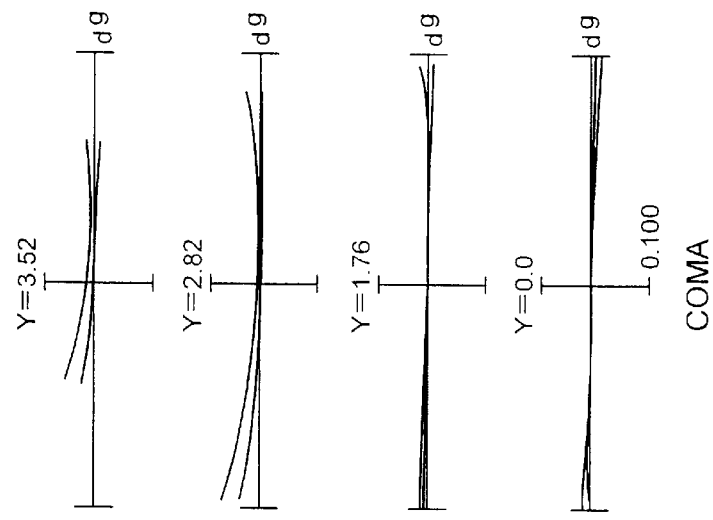
FIGS. 5A to 5E show various aberration charts of the master lens alone.
Figure 5D:
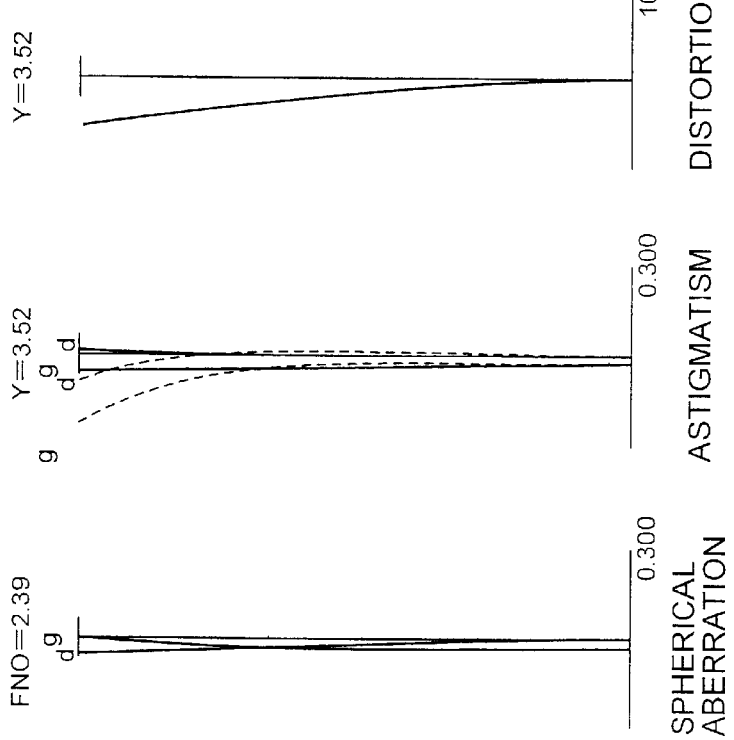
Figure 5E:
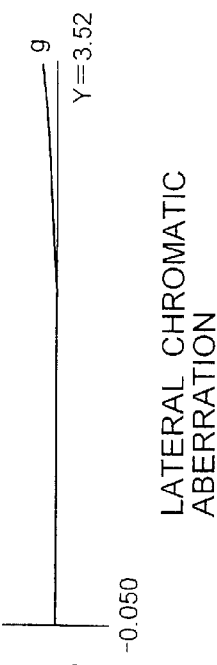

FIG. 1 is a drawing showing a sectional view of a state where a wide converter lens A according to an Example 1 of the present invention is attached to a master lens B. The wide converter lens is composed of, in order from an object, a first positive lens L1 having double convex surfaces, a first negative lens L21 with a meniscus shape having a convex surface facing to the object side, and a second positive lens L3 having double convex surfaces.

FIG. 2 is a drawing showing a sectional view of a state where a wide converter lens A according to an Example 2 of the present invention is attached to the master lens B. The wide converter lens is composed of, in order from an object, a first positive lens L1 having double convex surfaces, a first negative lens L21 with a meniscus shape having a convex surface facing to the object side, a second negative lens L22 with a meniscus shape having a convex surface facing to the object side, and a second positive lens L3 having double convex surfaces.

In Tables 1 and 2 shown below, various values associated with Examples 1 and 2 are shown. In Tables, ri denotes the radius of curvature of the i-th lens surface counted from the object side, di denotes the distance along the optical axis between the i-th and the (i+1)th lens surfaces counted from the object side, and ni and $\upsilon 1$ denote refractive index and Abbe number for d-line ($\lambda$=587.6 nm), respectively, of the medium between the i-th and the (i+1)th lens surfaces counted from the object side, wherein refractive index of air (n=1.00000) is abbreviated.

Moreover, in the following each embodiment, "mm" is generally used for the unit of length of the focal length f, radius of curvature r, space (distance) between surfaces d, or the like unless otherwise specified. However, since an optical system proportionally enlarged or reduced its dimension can be obtained similar optical performance, the unit is not necessary to be limited to "mm" and any other suitable unit can be used.

TABLE 1

<Example 1>

Magnification of the wide converter lens: m = 0.667
Angle of View: 2ω = 86.3°
Lens Data:

| r1 = | 195.9346 | d1 = | 4.00000 | n1 = | 1.51680 | υ1 = | 64.10 |
|---|---|---|---|---|---|---|---|
| r2 = | −669.4220 | d2 = | 0.20000 | | | | |
| r3 = | 80.7468 | d3 = | 2.00000 | n3 = | 1.88300 | υ3 = | 40.77 |
| r4 = | 20.7015 | d4 = | 18.00000 | | | | |
| r5 = | 72.9180 | d5 = | 3.30000 | n5 = | 1.80518 | υ5 = | 25.43 |
| r6 = | −112.1078 | | | | | | |

TABLE 2

<Example 2>

Magnification of the wide converter lens: m = 0.630
Angle of View: 2ω = 90.48°
Lens Data:

| r1 = | 469.2325 | d1 = | 3.00000 | n1 = | 1.51633 | υ1 = | 64.14 |
|---|---|---|---|---|---|---|---|
| r2 = | −469.2325 | d2 = | 0.20000 | | | | |
| r3 = | 48.8078 | d3 = | 2.00000 | n3 = | 1.77250 | υ3 = | 49.61 |
| r4 = | 22.4968 | d4 = | 5.60000 | | | | |
| r5 = | 86.4408 | d5 = | 2.00000 | n5 = | 1.77250 | υ5 = | 49.61 |
| r6 = | 18.8926 | d6 = | 9.20000 | | | | |
| r7 = | 23.7015 | d7 = | 6.00000 | n7 = | 1.57501 | υ7 = | 41.49 |
| r8 = | −74.3906 | | | | | | |

Various values of the master lens B to which the wide converter lenses A according to Example 1 and 2 are attached are shown in Table 3. In Table 3, ri denotes the radius of curvature of the i-th lens surface counted from the object side, di denotes the distance along the optical axis between the i-th and the (i+1)th lens surfaces counted from the object side, and ni and υi denote refractive index and Abbe number for d-line (λ=587.6 nm), respectively, of the medium between the i-th and the (i+1)th lens surfaces counted from the object side, wherein refractive index of air (n=1.00000) is abbreviated.

An aspherical surface is expressed by the equation shown below.

$$Z(y)=(y^2/r)/[1+(1-K\cdot y^2/r^2)^{1/2}]+C4\cdot y^4+C6\cdot y^6+C8\cdot y^8+C10\cdot y^{10}$$

where y denotes the height in a vertical direction relative to the optical axis, Z(y) denotes displacement in the optical axis direction from the tangent plane on the vertex of the aspherical surface at the height y, r denotes radius of curvature at the vertex of the aspherical surface, K denotes the conical coefficient, and C4, C6, C8, and C10 denote aspherical surface coefficients.

In each Example, the distance between the most image side lens surface of the wide converter lens A and the most object side lens surface of the master lens B is 0.6.

TABLE 3

<Master Lens>

Focal Length: f = 5.93
f-number: Fno = 2.39
Angle of View: 2ω = 64.3°
Lens Data:

| r1 = | ∞ | d1 = | 1.000 | n1 = | 1.51680 | υ1 = | 64.10 |
|---|---|---|---|---|---|---|---|
| r2 = | ∞ | d2 = | 4.204 | | | | |
| r3 = | 22.2121 | d3 = | 1.100 | n3 = | 1.80610 | υ3 = | 33.27 |
| r4 = | 8.6992 | d4 = | 2.850 | | | | |
| r5 = | −40.9154 | d5 = | 1.000 | n5 = | 1.51680 | υ5 = | 64.20 |
| r6 = | 8.3011 | d6 = | 3.000 | n6 = | 1.84666 | υ6 = | 23.78 |
| r7 = | 20.0294 | d7 = | 19.833 | | | | |
| r8 = | Aperture Stop | d8 = | 1.000 | | | | |
| r9 = | 32.0291 | d9 = | 1.800 | n9 = | 1.80610 | υ9 = | 33.27 |
| r10 = | −179.4433 | d10 = | 0.100 | | | | |
| r11 = | 9.4557 | d11 = | 5.000 | n11 = | 1.67003 | υ11 = | 47.19 |
| r12 = | −12.7020 | d12 = | 3.950 | n12 = | 1.84666 | υ12 = | 23.78 |
| r13 = | 7.7984 | d13 = | 1.200 | | | | |
| r14 = | −1708.3816 | d14 = | 1.750 | n14 = | 1.80518 | υ14 = | 25.46 |
| r15 = | −31.0757 | d15 = | 0.800 | | | | |
| r16 = | 12.0582 | d16 = | 2.300 | n16 = | 1.83500 | υ16 = | 42.97 |
| r17 = | 63.5771 | d17 = | 3.000 | | | | |
| r18 = | 111.2911 | d18 = | 1.900 | n18 = | 1.66547 | υ18 = | 55.18 |
| r19 = | −22.0165 | d19 = | 1.000 | | | | |
| r20 = | ∞ | d20 = | 2.900 | n20 = | 1.51680 | υ20 = | 64.10 |
| r21 = | ∞ | d21 = | 1.600 | | | | |
| r22 = | ∞ | d22 = | 0.800 | n22 = | 1.51680 | υ22 = | 64.10 |
| r23 = | ∞ | | | | | | |

Aspherical Surface Data
<surface number 19>
K=1.0000
C4=2.99060×10$^{-4}$
C6=−3.22060×10$^{-6}$
C8=2.79020×10$^{-7}$
C10=−7.93530×10$^{-9}$ Values for the conditional expressions according to the Examples 1 and 2 are shown below in Table 4.

TABLE 4

<Example 1>

(1) (r2 + r1)/(r2 − r1) = 0.547
(2) υ1 = 64.10

<Example 2>

(1) (r2 + r1)/(r2 − r1) = 0.000
(2) υ1 = 64.14

FIGS. 3A to 3E show various aberration charts produced in the state where the wide converter lens according to the Example 1 is attached to the master lens B. FIGS. 4A to 4E show various aberration charts produced in the state where the wide converter lens according to the Example 2 is attached to the master lens B. FIGS. 5A to 5E show various aberration charts of the master lens alone. In each chart, FNO denotes f-number, Y denotes the image height, d denotes d-line (λ=587.6 nm), and g denotes g-line (λ=435.6 nm). In the charts showing astigmatism, a solid line indicates a sagittal image plane and a broken line indicates a meridional image plane.

As is apparent from respective charts showing various aberrations, excellent compensation is made for various aberrations without deteriorating the optical performance of the master lens.

As stated above, the present invention makes it possible to provide a wide converter having an angle of view of about 80° or over with fewer appearance of distortion.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A wide converter lens used by attaching to an object side of a photographic lens and consisting of, in order from the object side:

a first positive lens having double convex surfaces;

a negative lens unit including at least one negative lens; and a second positive lens having double convex surfaces;

wherein the following conditional expression is satisfied;

$$-0.8<(r2+r1)/(r2-r1)<0.8$$

where r1 denotes a radius of curvature of the object side surface of the first positive lens and r2 denotes the radius of curvature of the image side surface of the first positive lens.

2. The wide converter lens according to claim 1, wherein the negative lens unit consists of a first negative lens with a meniscus shape having a convex surface facing to the object side.

3. The wide converter lens according to claim 1, wherein the negative lens unit consists of, in order from the object side:

a first negative lens with a meniscus shape having a convex surface facing to the object side; and a second negative lens with a meniscus shape having a convex surface facing to the object side.

4. The wide converter lens according to claim 1, wherein the following conditional expression is satisfied:

$$45<\upsilon 1$$

where $\upsilon 1$ denotes Abbe number of the first positive lens.

5. The wide converter lens according to claim 4, wherein the negative lens unit consists of a first negative lens with a meniscus shape having a convex surface facing to the object side.

6. The wide converter lens according to claim 4, wherein the negative lens unit consists of, in order from the object side:

a first negative lens with a meniscus shape having a convex surface facing to the object side; and a second negative lens with a meniscus shape having a convex surface facing to the object side.

7. A wide converter lens used by attaching to an object side of a photographic lens and comprising, in order from the object side:

a first positive lens having double convex surfaces;

a negative lens unit including at least one negative lens; and a second positive lens having double convex surfaces;

wherein the following conditional expression is satisfied:

$$-0.8<(r2+r1)/(r2-r1)<0.8$$

where r1 denotes a radius of curvature of the object side surface of the first positive lens and r2 denotes the radius of curvature of the image side surface of the first positive lens;

wherein the negative lens unit consists of, in order from the object side:

a first negative lens with a meniscus shape having a convex surface facing to the object side; and a second negative lens with a meniscus shape having a convex surface facing to the object side.

8. The wide converter lens according to claim 7, wherein the following conditional expression is satisfied:

$$45<v1$$

where v1 denotes Abbe number of the first positive lens.

* * * * *